US007085718B2

(12) United States Patent
Kemp

(10) Patent No.: US 7,085,718 B2
(45) Date of Patent: Aug. 1, 2006

(54) METHOD FOR SPEAKER-IDENTIFICATION USING APPLICATION SPEECH

(75) Inventor: Thomas Kemp, Remseck (DE)

(73) Assignee: Sony Deutschland GmbH, Cologne (DE)

(*) Notice: Subject to any disclaimer, the term of this patent is extended or adjusted under 35 U.S.C. 154(b) by 759 days.

(21) Appl. No.: 10/139,558

(22) Filed: May 6, 2002

(65) Prior Publication Data
US 2002/0169609 A1 Nov. 14, 2002

(30) Foreign Application Priority Data
May 8, 2001 (EP) .................... 01111058

(51) Int. Cl.
G10L 15/06 (2006.01)
G10L 15/04 (2006.01)
G10L 13/08 (2006.01)
G10L 13/02 (2006.01)

(52) U.S. Cl. ............ 704/244; 704/250; 704/251; 704/260; 704/261

(58) Field of Classification Search ........... 704/238, 704/239, 240, 246, 249, 244, 250, 251, 260, 704/261
See application file for complete search history.

(56) References Cited

U.S. PATENT DOCUMENTS 5,719,921 A * 2/1998 Vysotsky et al. ....... 379/88.01
5,946,654 A * 8/1999 Newman et al. ............ 704/246
5,960,392 A   9/1999 Sundberg et al.
6,092,043 A * 7/2000 Squires et al. ............. 704/255
6,253,179 B1 * 6/2001 Beigi et al. ................. 704/246
6,253,181 B1 * 6/2001 Junqua ....................... 704/255
6,804,647 B1 * 10/2004 Heck et al. ................. 704/246

OTHER PUBLICATIONS

Fredouille C et al: "Behavior of a Bayesian Adaptation Method for Incremental Enrollment in Speaker Verification" IEEE International Conference on Acoustics, Speech, and Signal Processing. Proceedings (Cat. No. 00CH37100), Proceedings of the 2000 International Conference on Acoustics, Speech and Signal Processing, Istanbul, Turkey, Jun. 5-9, 2000, pp. 111197-111200, vol. 2, XP002179367.

Mistretta W et al: "Model Adaptation Methods for Speaker Verification" Proceedings of the 1998 IEEE International Conference on Acoustics, Speech and Signal Processing. ICASSP '98. Seattle, WA, May 12-15, 1998, IEEE International Conference on Acoustics, Speech and Signal Processing, New York, NY: IEEE, US, vol. 1, Conf. 23, May 12, 1998, pp. 113-116, XP000854528.

Del Alamo C M et al: "Incremental Speaker Adaptation With Minimum Error Discriminative Training for Speaker Identification" Proceedings of the International Conference on Spoken Language Processing, XX, XX, vol. 3, Oct. 3, 1996, pp. 1760-1763, XP 002154694.

* cited by examiner

Primary Examiner—Richemond Dorvil
(74) Attorney, Agent, or Firm—Oblon, Spivak, McClelland, Maier & Neustadt, P.C.

(57) ABSTRACT

It is suggested to include application speech (AS) into the set of identification speech data (ISD) for training a speaker-identification process so as to make possible a reduction of the set of initial identification speech data (IISD) to be collected within an initial enrolment phase and therefore to add more convenience for the user to be registered or enrolled.

22 Claims, 1 Drawing Sheet

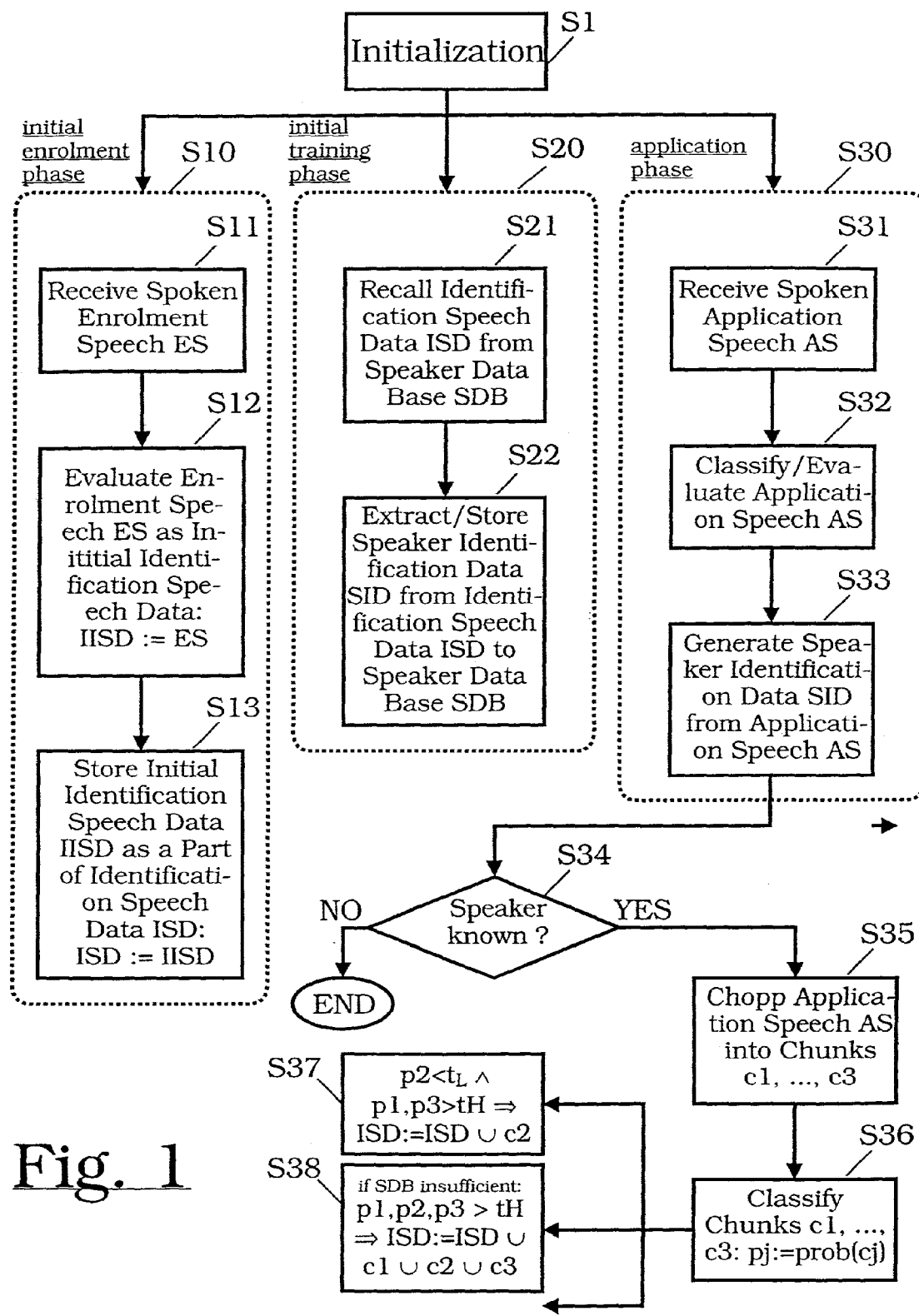

METHOD FOR SPEAKER-IDENTIFICATION USING APPLICATION SPEECH

The present invention relates to a method for speaker-identification and in particular to a method for speaker-identification in which speech of an application or usage phase is used for the identification process.

A large variety of equipment and appliances employ man-machine dialogue systems or the like to ensure an easy and reliable use of the equipment or to check the identity of an user, for example in an entrance area or the like. Therefore, in many cases the identification of a person based only on a speech input is necessary. Current and known speaker-identification methods and systems have to be trained and have to register possible speakers who are involved in the system. To ensure particular high identification rates and a large reliability of the identification result, each speaker has to register and has to be enrolled by speaking a certain amount of predetermined and predefined text.

The amount of speech from each of the enrolled speakers should be as high as possible to ensure a good performance within the identification process. On the other hand, the speech to be recorded in the enrolment phase should be as short as possible to minimize the inconvenience for a user.

It is therefore an object of the present invention to provide a method for speaker-identification which reduces the burden of the enrolment phase for the user and which also ensures a good performance, in particular with respect to the identification rate of the involved speakers.

The object is achieved by a method for speaker-identification according to claim 1. Preferred and advantageous embodiments of the inventive method for speaker-identification are within the scope of the dependent subclaims. The object is also achieved by a system for speaker-identification according to claim 15 and a computer program product according to claim 16.

The inventive method for speaker-identification, in particular in a method and/or a system for recognizing speech, an initial enrolment and/or training phase and an application phase are provided. In said initial enrolment and/or training phase, spoken enrolment speech from at least one speaker is collected and/or stored as initial identification speech data within a set of identification speech data. From the entire identification speech data, speaker-identification and/or classification data are derived for said speaker and/or are stored in a speaker data-base. During said application phase, spoken application speech from at least one current speaker is received and evaluated with respect to speaker-identification and/or classification data contained in said speaker data-base. This is done to at least classify said current speaker as being known or unknown. Further, at least a part of received application speech of a current speaker being classified as an already known speaker is used as additional identification speech data so as to increase the amount of identification speech data for said speaker and/or to increase the rate and reliability of speaker-identification.

It is therefore a key idea of the present invention not only to use spoken speech as initial identification speech data collected during an initial enrolment and/or training phase to construct the set of identification speech data on which the training and the performance of the method for speaker-identification is based. It is instead suggested to use spoken speech received and collected during the application of the method for speaker-identification as a data source on which the training and the refinement of the identification process can also be based. This increases the amount of identification speech data and therefore makes the identification process more confident and reliable.

According to a preferred embodiment of the inventive method for speaker-identification, it is therefore suggested to include the additional identification speech data into the set of identification speech data for each speaker and to perform an additional step of generating and updating said speaker-identification data based on the enriched set of identification speech data.

The step of generating and updating said speaker-identification and/or classification data can be performed in an online and real-time manner or as a postprocessing step. When the generating and updating step is performed in an on-line manner, it can be carried out parallely to the application or sequentially during a break or pause within the application.

In the beginning of the application of the identification process or method, the identification per se is based on the initial identification speech data. Therefore, in the very beginning of the application of the inventive method, the incoming spoken application speech is classified with respect to the features and the comparison to the given initial identification speech data.

It is therefore of particular advantage to use parts of application speech as additional identification speech data for a given and known speaker which have a comparable low confidence, reliability or probability to belong to said known speaker as these low confidence parts of said application speech carry a large amount of new information which has not yet been collected. The comparison of the confidence, reliability, or probability can be carried out with respect to a given first threshold value.

In particular in the case of continuous utterances, low confidence parts of said application speech can be used as additional identification speech data for a given known speaker, if they are included in, embedded in, and/or surrounded by high confidence parts of said application speech which have a comparable high confidence, reliability or probability to belong to said known speaker, in particular with respect to a given second threshold value which is not lower than said first threshold value. This offers the advantage that low confidence parts which are embedded in high confidence parts of application speech probably belong to the same speaker because of the continuity of the spoken utterance.

The division of the continuous speech into parts can be carried out by using a continuous section of application speech which is then chopped into chunks to build said parts of application speech. As confidence measures often judge confidence on the basis of words, sub-word units or the like it is of particular advantage to build said chunks as groups or short sequences of words or the like, instead of choosing them as parts of the acoustical signal.

Advantageously, said chunks are then classified with respect to their confidence, reliability, and/or probability to stem from a given known speaker. Every chunk is classified in a separate and isolated manner, in particular in comparison with said given first and second threshold values.

In a further embodiment of the inventive method, utterances within said application speech are not used as additional identification speech data, if the confidences all of their parts, chunks, or the like are low, in particular below said first threshold value. On the other hand, utterances within said application speech are used as certain utterances within said additional identification speech data, if the confidence of all of their parts, chunks, or the like are high, in particular above said second threshold value.

As said certain utterances do not carry much new information with respect to an enrolled and registered speaker, these certain utterances for a given speaker are rejected from being included in said additional identification speech data for said speaker, if the amount of certain utterances already collected and included in said additional identification speech data exceeds a given threshold for said speaker. According to this measure, the amount of certain utterances within said additional identification speech data or within said identification speech data can be limited so that the method focuses on parts of the application speech which carry much more information with respect to the current speaker, i.e. the low confidence parts.

The inventive method and its identification process can be based on a closed scenario with contribution from enrolled speakers only and/or also on a probabilistic model.

On the other hand, the identification process can be based on an open scenario enabling contributions from non-enrolled speakers and/or it can be based on a generic speaker model in this case.

It is a further aspect of the present invention to provide a system, an apparatus, a device, and/or the like for speaker-identification which is in each-case capable of performing and/or of realizing the inventive method for speaker-identification and/or of its steps.

Additionally, it is a further aspect of the present invention to provide a computer program product comprising computer program means which is adapted to perform and/or to realize the inventive method for speaker-identification or of its steps while it is executed on a computer, a digital signal processing means, and/or the like.

The above-mentioned aspects and further advantages of the present invention will become more elucidated taking into account the following remarks: For speaker-identification, the amount of speech from each of the enrolled speakers should be as high as possible to ensure a good performance and a high identification rate. The speech recorded therefore in the enrolment phase, however, should be short to minimize the inconvenience for the user.

It is therefore proposed to use speech from the users which is not uttered in the enrolment phase but in the usage or application phase to increase the amount of data on which the identification training is based. It is therefore proposed to use speech that is classified with a low reliability but that is included in or surrounded by speech being classified as being high reliable as speech from a given and registered speaker.

All speaker-identification systems need a so-called enrolment phase where speech from all users is collected and made known to the system along with the corresponding speaker's identity.

Generally, the problem of insufficient enrolment material is tackled by elongating the enrolment phase. In some speaker verification systems when the speaker's identity is claimed by the speaker, it has been proposed to use all the speech that is passed through the verification stage, i.e. it is supposed to be from the true target speaker, to increase the amount of enrolment material.

However, for speaker-identification the situation is different, as the speaker identity needs to be determined first and the a priori probability of correctly classifying a speaker is generally much lower than the a priori probability of an impostor in a speaker verification system.

The two key ideas of the invention are the usage of confidence verified input speech to increase the amount of enrolment speech and the usage of segments between two high-confidence segments rather than the two high-confidence segments themselves.

Because of the above-mentioned situation, current state-of-the-art methods for speaker-identification have therefore to search for a trade-off between the two goals of high-recognition accuracy and convenience of the user, as high-recognition accuracy can only be achieved, if the user speaks for a long time—several minutes or more—during the enrolment phase which of course may be inconvenient for the user. This enrolment consists of reading or repeating utterances that are prompted to the user by the system or method. The enrolment task is error-prone, cumbersome, and inconvenient.

It is therefore proposed to use speech from the user that is not uttered in the enrolment but in the usage phase to increase the amount of data on which the identification training can be based. Since this speech is taken from the application scenario, there is no additional burden for the speaker or the user. Therefore, the new approach combines high identification accuracy with high user convenience and works in a totally unsupervised manner.

Initially, an enrolment needs to be performed for every user but should be recognized by the system. This enrolment phase is not different from the enrolment in current speaker-identification systems, excepting that the amount of speech recorded may be lower to increase the comfort for the user.

With the enrolment data, a standard speaker identification system is trained in one of the ways described in the literature or any other way which may be devised in the future. The proposed inventive method is independent of the training method and of the model type. The only requirement is that the model quality is better for more enrolment data. This condition is very weak and is fulfilled for all known algorithms so far.

During the usage phase of the system, the input speech is classified as speech from e.g. a speaker B as opposed to speakers A and C. Then, the recorded continuous utterance is chopped into chunks $c1, \ldots, c5$, where in particular each of said chunks $c1, \ldots, c5$ may be build up as a group or short sequence of words or the like. Each of the chunks is then classified again and the confidence into the classification result is recorded. Such a confidence can for a probabilistic model be computed by normalizing a relative likelihood (the model score) for speaker B with the likelihood of all speakers added together which is 1 by definition of a close scenario. For an open scenario where also non-enrolled speakers may use the system and should be recognized as non-enrolled, a generic speaker model can be added to the model to aid the discrimination. If the confidences of all parts are below a predefined threshold, the utterance is not used. If all confidences are above the predefined threshold, the data or utterance is added to the enrolment data and the model is retrained when the system is not used. Retraining can be performed for an entertainment robot e.g. during the recharge period of the batteries or in the case of an help desk during a break or the night. This increases the performance of the system.

However, the memory that is available to store the data is limited. Additionally, the high confidence into the speaker identity for the unknown speaker means that the speech matches the stored speaker characteristics very well. This, in turn, means that this speech does not add much information to the model. Therefore, the amount of collected enrolment data is continuously monitored. After a certain length the speech has been stored, no more high-confidence segments are added and stored.

In this last adaptation phase, only utterances, where the confidence for the subsegments—for instance c2 and c4—is low but for adjacent subsegments for instance c1, c3, and c5—is high, are used. Since the speech is uninterrupted, it can be assumed to be from a single source or speaker. Parts of the entire utterance—c2 and c4—exhibit new properties that are hitherto unknown to the models or the system. Therefore, in the last adaptation phase, only the subsegments c2 and c4 in the above-mentioned example would be added to the enrolment data storage. This increases the robustness of the automatic adaptation by selecting the most valuable parts of the data.

The invention can be summarized as follows: The enrolment phase is shortened and the initial performance of the system or method can be lower. But the performance automatically increases as the user adds more speech to the system in the usage or an application phase. The system performs better for users who use the system more frequently. By this behavior, the average performance level is automatically increased. By the specific way of selection of the user data, more emphasis is given to the data that less closely resembles the system's models. Thereby, the robustness against variations in a speaker's voice caused e.g. by a sore throat of the speaker or the like is increased.

In the following, further advantages and aspects of the invention will be described taking reference to the accompanying figure.

FIG. 1 is a schematical block diagram describing a preferred embodiment of the inventive method for speaker-identification.

The embodiment of the inventive method shown in FIG. 1 is essentially built up by three sections S10, S20, and S30. In the first section S10, the initial enrolment is performed. In the second section S20, the method or system is trained on a given identification speech data ISD. In the third section S30, the method is applied that a distinct application after the first and second section S10 and S20 of enrolment and first training have been performed at least once.

In a first step S11 of the first section S10 of the initial enrolment phase, spoken enrolment speech ES is received. In a second step S12, the enrolment speech ES is set as initial idenfication speech data IISD and stored as a part of the entire set of identification speech data ISD in a speaker data-base SDB in step S13.

In the second section S20 of the embodiment shown in FIG. 1, the training phase is performed which is based on the set of identification speech data ISD currently available. The set of identification speech data is recalled from the speaker data-base SDB in step S21 and then in step S22, speaker identification and/or classification data SID are generated from the set of identification speech data ISD. The generated speaker identification and/or classification data SID are stored in the speaker data-base SDB.

After the steps S10 and S20 of enrolment and training have been performed at least once, the method and the system can be applied. The application step S30 can be included in person-verification and -identification systems, a system for recognizing speech or the like.

In the first step S31 of the application phase S30, spoken application speech AS is received. Then, the received application speech AS is classified and evaluated in step S32. In the following step S33, speaker-identification and/or -classification data SID are generated from the received and classified application speech AS. In comparison with the given speaker data-base SDB, it is checked in step S34 whether the current speaker is known or unknown to the system or method. In the case of an unknown speaker, the received application speech AS is not further processed in the embodiment of FIG. 1.

If the current speaker is classified as a known speaker in step S34 based on the application speech AS received and the given speaker data-base SDB, the application speech AS is chopped into parts or chunks, namely into three chunks c1, c2, and c3 in step S35 in the embodiment of FIG. 1. In the following step S36, each of the divided chunks c1, c2, and c3 is classified with respect to their probability pj based on a given probability measure prob: $p_j := prob(c_j)$.

In the following three steps S37, S38, . . . , different cases are evaluated to include all or only selected chunks c1, c2, c3 of the application speech AS as additional identification speech data AISD into the set of identification speech data ISD and to the speaker data base SDB.

The invention claimed is:

1. A method for speaker-identification, in a method and/or a system for recognizing speech, comprising the steps of:
   collecting and/or storing spoken enrollment speech (ES) in an initial enrollment and/or training phase from at least one speaker as identification speech data (ISD) from which speaker-identification and/or classification data (SID) are derived for said speaker and/or stored in a speaker data-base (SDB),
   wherein in an application phase spoken application speech (AS) from at least one current speaker is received and evaluated with respect to speaker-identification and/or classification data (SID) of said speaker data-base (SDB) so as to at least classify said current speaker as being known or unknown,
   wherein at least a part of received application speech (AS) of a current speaker being classified as an already known speaker is used as additional identification speech data (AISD) so as to increase the amount of identification speech data (ISD) for said speaker and/or the rate and reliability of speaker-identification,
   wherein parts of said application speech (AS) are used as additional identification speech data (AISD) for a given known speaker which have a comparable low confidence, reliability, or probability to belong to said known speaker, in particular with respect to a given first threshold value ($t_L$), and
   wherein low-confidence parts of said application speech (AS) are used as additional identification speech data (AISD) for a given known speaker which are included in, embedded in, and/or surrounded by high-confidence parts of said application speech (AS) having a comparable high confidence, reliability, or probability to belong to said known speaker, in particular above a given second threshold value ($t_H$) not lower than said first threshold value ($t_L$).

2. The method according to claim 1, further comprising the steps of:
   enriching the identification speech data by including said application speech data (ASD) into said identification speech data (ISD) for each speaker; and
   generating and updating said speaker-identification and/or classification data (SID) based on said enriched identification speech data (ISD).

3. The method according to claim 2, wherein the step of generating and updating said speaker-identification and/or classification data (SID) is performed in an online and/or real-time manner or as a postprocessing step.

4. The method according to claim 1, wherein a continuous section of said application speech (AS) is chopped into chunks to build said parts of application speech (AS).

5. The method according to claim 4, wherein said chunks are classified with respect to their confidence, reliability, and/or probability to belong to a given known speaker.

6. The method according to claim 1, wherein utterances within said application speech (AS) are not used as additional identification speech data (AISD) for which the confidences of all its parts, chunks, or the like are low, in particular below said first threshold value ($t_L$).

7. The method according to claim 1, wherein the identification process is based on a closed scenario with contributions from enrolled speakers only and/or is based on a probabilistic model.

8. The method according to claim 1, wherein the identification process is based on an open scenario enabling contributions from non-enrolled speakers and/or is based on a generic speaker model.

9. The method according to claim 1, wherein a minimal set of initial identification speech data (IISD) is used to ensure at least minimal discrimination and identification rates.

10. The method according to claim 1, wherein the termination of the initial enrolment phase can be ordered by a speaker.

11. A System for speaker-identification which is capable of and which comprises means for performing and realizing a method for speaker-identification according to claim 1.

12. A computer readable medium comprising:
computer program code adapted to perform the method for speaker-identification according to claim 1.

13. A method for speaker-identification, in a method and/or a system for recognizing speech, comprising the steps of:
collecting and/or storing spoken enrollment speech (ES) in an initial enrollment and/or training phase from at least one speaker as identification speech data (ISD) from which speaker-identification and/or classification data (SID) are derived for said speaker and/or stored in a speaker data-base (SDB),
wherein in an application phase spoken application speech (AS) from at least one current speaker is received and evaluated with respect to speaker-identification and/or classification data (SID) of said speaker data-base (SDB) so as to at least classify said current speaker as being known or unknown,
wherein at least a part of received application speech (AS) of a current speaker being classified as an already known speaker is used as additional identification speech data (AISD) so as to increase the amount of identification speech data (ISD) for said speaker and/or the rate and reliability of speaker-identification,
wherein utterances within said application speech (AS) are used as certain utterances in said additional identification speech data (AISD) for which the confidence of all its parts, chunks, or the like are high, in particular above a second threshold value ($t_H$), and
wherein certain utterances of a given speaker are rejected from being included in said additional identification speech data (AISD) for said speaker for the case that the amount of said certain utterances within said additional identification speech data (AISD) exceeds a given threshold for said speaker.

14. The method according to claim 13, further comprising the steps of:
enriching the identification speech data by including said application speech data (ASD) into said identification speech data (ISD) for each speaker; and
generating and updating said speaker-identification and/or classification data (SID) based on said enriched identification speech data (ISD).

15. The method according to claim 13, wherein a continuous section of said application speech (AS) is chopped into chunks to build said parts of application speech (AS).

16. The method according to claim 13, wherein utterances within said application speech (AS) are not used as additional identification speech data (AISD) for which the confidences of all its parts, chunks, or the like are low, in particular below said first threshold value ($t_L$).

17. The method according to claim 13, wherein the identification process is based on a closed scenario with contributions from enrolled speakers only and/or is based on a probabilistic model.

18. The method according to claim 13, wherein the identification process is based on an open scenario enabling contributions from non-enrolled speakers and/or is based on a generic speaker model.

19. The method according to claim 13, wherein a minimal set of initial identification speech data (IISD) is used to ensure at least minimal discrimination and identification rates.

20. The method according to claim 13, wherein the termination of the initial enrolment phase can be ordered by a speaker.

21. A System for speaker-identification which is capable of and which comprises means for performing and realizing a method for speaker-identification according to claim 13.

22. A computer readable medium comprising:
computer program code adapted to perform the method for speaker-identification according to claim 13.

* * * * *